United States Patent [19]
McCollum et al.

[11] Patent Number: 5,666,646
[45] Date of Patent: Sep. 9, 1997

[54] RADIO FREQUENCY (RF) CONVERTER SYSTEM WITH DISTRIBUTED PROTECTION SWITCHING AND METHOD THEREFOR

[75] Inventors: Robert McCollum, Chandler; Phillip Wayne Blackwell, Phoenix, both of Ariz.

[73] Assignee: Comtech, Tempe, Ariz.

[21] Appl. No.: 419,436

[22] Filed: Apr. 10, 1995

[51] Int. Cl.$^6$ .................................................. H04B 3/36
[52] U.S. Cl. ...................... 455/8; 455/15; 455/9
[58] Field of Search .................. 455/8, 9, 323, 455/314, 22, 20, 53.1, 286, 86, 15, 23

[56] References Cited

U.S. PATENT DOCUMENTS

| | | | |
|---|---|---|---|
| 4,039,947 | 8/1977 | Miedema | 325/2 |
| 5,548,813 | 8/1996 | Charas et al. | 455/33.3 |

*Primary Examiner*—Reinhard J. Eisenzopf
*Assistant Examiner*—Darnell R. Armstrong
*Attorney, Agent, or Firm*—Harry M. Weiss; Jeffrey D. Moy; Harry M. Weiss & Associates, P.C.

[57] ABSTRACT

The present invention relates to an improved RF converting system. The RF converting system is comprised of a plurality of RF converter modules which are configured for redundant system operation using distributed protection switching in an active "daisy chain" configuration. The "daisy chain" configuration distributes the converter protection switching functions to each individual RF converter module through a switching module coupled to each of the RF converter modules. The "daisy chain" terminates in a backup RF converter which assumes the frequency and attenuation of a faulted RF converter module. A high speed bus provides communication interface between each of the online RF converter modules and the backup RF converter module so that the backup RF converter module can detect faults and reconfigure the system to replace a failed RF converter module. When a fault is detected on an RF converter module, the faulted RF converter module can be detached from the active RF converting system by separating the RF converter module from its switch module leaving the active online RF converting system intact through the switch module. The distributed protection switching in an active "daisy chain" configuration may also be used to provide reliable backup protection for other types of communication equipment.

22 Claims, 5 Drawing Sheets

RADIO FREQUENCY (RF) CONVERTER SYSTEM WITH DISTRIBUTED PROTECTION SWITCHING AND METHOD THEREFOR

BACKGROUND OF THE INVENTION

1. Field of the Invention

This invention relates generally to radio frequency (RF) converters and, more specifically, to an RF converter system with a distributed protection switching scheme which provides reliable backup protection to prevent disruptions in communication due to an RF converter failure.

2. Description of the Prior Art

Radio frequency (RF) converters are a type of communication equipment which are used in satellite ground stations. In general, RF converters are commonly categorized as being an up converter or a down converter. Up converters are used in the transmission of communication signals, while down converters are used to receive communication signals from a satellite.

Most RF converting systems are comprised of a plurality of RF converter modules (either up or down converters) which are used for converting an inputted signal. The plurality of RF converter modules are all directly coupled to a centralized switching unit. The centralized switching unit provides backup protection to prevent disruptions in communication due to an RF converter module failure. When a fault occurs on any of the RF converter modules, the centralized switching unit can switch the RF converter module where the fault had occurred to a backup RF converter module.

While present RF converting systems do provide reliable backup protection in case of an RF converter module failure, there are several problems with current designs. Current RF converting systems use a centralized switching unit to provide backup protection for an RF converter module failure. These centralized switching units limit the capability of expanding the RF converting system to include more RF converter modules since most centralized switching units can only handle up to eight separate RF converter modules.

The main problem with a centralized switching unit is that a centralized switching unit requires each RF converter module to be directly coupled to the centralized switching unit in order to provide reliable backup protection for each RF converter module. This requirement causes long cable runs from the RF converter modules to the centralized switching unit which increases the cost of the RF converting system. Furthermore, centralized switching causes added cable losses and actually contributes to the degradation of availability by the mean time between failures (MTBF) of the added logic hardware and extra power supplies.

Therefore, a need existed to provide an improved RF converting system. The improved RF converting system must be easier and less costly to expand. The improved RF converting system must be able to provide reliable backup protection without the use of long cable runs from the centralized switching unit to each RF converter module. The improved RF converting system must also do away with the Other problems associated with using a centralized switching unit.

SUMMARY OF THE INVENTION

It is an object of the present invention to provide an improved RF converting system and method therefor.

It is another object of the present invention to provide an improved RF converting system and method therefor that provides reliable backup protection without the use of a centralized switching unit.

It is still another object of the present invention to provide an improved RF converting system and method therefor that is easier and less costly to expand than current RF converting systems.

BRIEF DESCRIPTION OF THE PREFERRED EMBODIMENTS

In accordance with one embodiment of the present invention, an improved RF converting system is disclosed. The improved RF converting system is comprised of a first RF converter means for modulating an inputted signal to a desired frequency. A switch means is coupled to the first RF converter means for switching the inputted signal and outputted frequency from the first RF converter means to a backup RF converter means when a fault occurs on the first RF converter means. A backup RF converter means is coupled to the first RF converter means for performing fault detection and for assuming a frequency and an attenuation of the first RF converter means when a fault occurs on the first RF converter means. An input/output module means is coupled to the backup RF converter means for receiving the inputted signal from the first RF converter means when a fault occurs on the first RF converter means and for outputting the desired frequency. A high speed bus means is coupled to the backup RF converter means and the first RF converter means for providing an interface between the first RF converter means and the backup RF converter means so the backup RF converter means can monitor configuration changes in the first RF converter means. The improved RF converting system can be expanded to include a plurality of RF converter means coupled to the first RF converter means. The plurality of RF converter means would each have a switch for looping each of the plurality of RF converter means to a successive RF converter means and for switching any of the plurality of RF converter means to the backup converter means when a fault had occurred. The high speed bus means would also be looped from the backup RF converter means to each of the plurality of RF converter means to allow the back up RF converter means to monitor configuration changes in each of the plurality of RF converter means.

According to another embodiment of the present invention a method for providing an improved RF converter system is disclosed. The method comprises the steps of: providing a first RF converter for modulating an inputted signal to a desired frequency; providing a switch coupled to the first RF converter for switching the inputted signal and outputted frequency from the first RF converter to a backup RF converter when a fault occurs on the first RF converter; providing a backup RF converter coupled to the first RF converter for performing fault detection and for assuming a frequency and an attenuation of the first RF converter when a fault occurs on the first RF converter; providing an input/output module coupled to the backup RF converter for receiving the inputted signal from the first RF converter when a fault occurs on the first RF converter and for outputting the desired frequency; and providing a high speed bus coupled to the backup RF converter and the first RF converter for providing an interface between the first RF converter and the backup RF converter so the backup RF converter can monitor configuration changes in the first RF converter. The method of providing an improved RF converting system could also be expanded to include a plurality of RF converters coupled to the first RF converter. This method would further include the steps of providing a plurality of RF converters each having a switch for looping each of the plurality of RF converters to a successive RF converter and for switching any of the plurality of RF converters where a fault had occurred to the backup converter and looping the high speed bus so that each of the plurality of RF converters is coupled to a successive RF converter to allow the back up converter to monitor configuration changes in each of the RF converters.

DETAILED DESCRIPTION OF THE PREFERRED EMBODIMENTS

Figure 1:
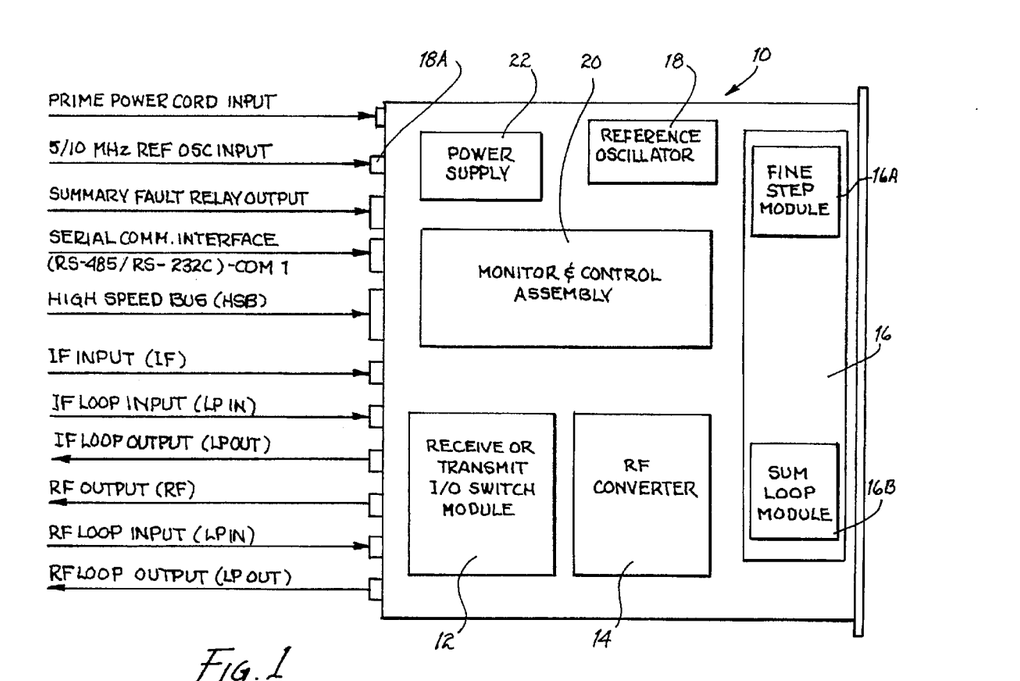
FIG. 1 shows a simplified block diagram of an RF up converter module with the distributed protection switching scheme of the present invention.
Figure 2:
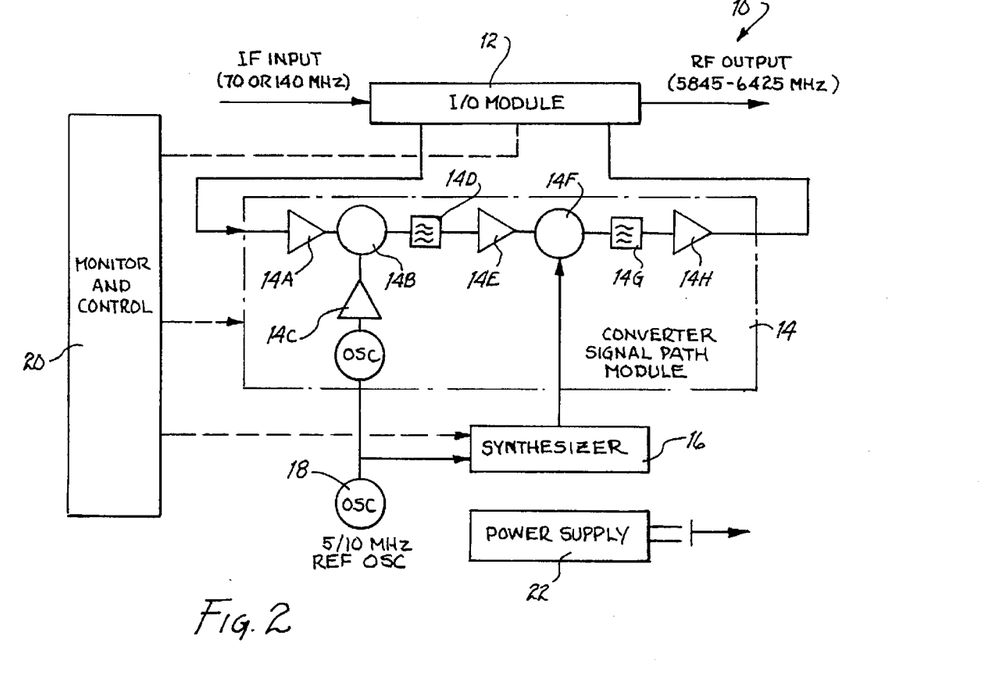
FIG. 2 shows a functional block diagram of an RF up converter module with the distributed protection switching scheme of the present invention.

Referring to FIGS. 1 and 2, an RF up converter 10 is shown. The RF up converter 10 is comprised of an input/output (I/O) switch 12 for receiving an inputted intermediate frequency (IF) and outputting a modulated radio frequency (RF). The I/O switch 12 is coupled to a converter 14. The converter 14 modulates the inputted IF to produce the desired RF. A synthesizer 16 is coupled to the converter 14 for providing a frequency to modulate the inputted IF to the desired outputted RF. A reference oscillator 18 is coupled to the converter 14 and to the synthesizer 16. The reference oscillator 18 is a highly stable oscillator which is used to determine the stability and to help stabilize the converter 14 and the synthesizer 16. The reference oscillator 18 can be an internal oscillator or it can be external to the RF up converter 10 and coupled to the RF up converter 10 at an input 18A (see FIG. 1). A monitor and control module 20 is coupled to the I/O switch 12, the converter 14 and the synthesizer 16 for controlling the modulation of the inputted IF to the desired RF. The monitor and control module 20 is also used for providing communication interface with a backup RF up converter (not shown in FIGS. 1 or 2, but shown in FIG. 3). All of the above components are coupled to a power supply 22 which supplies power to all of the components of the RF up converter 10. As can be seen from FIG. 1, the synthesizer 16 is comprised of two separate components. The fine step module 16A is used for increasing the frequency of the synthesizer in predetermined increments in order to modulate the inputted IF to the desired RF. In the preferred embodiment of the present invention, the fine step module 16A increases or decreases the frequency of the synthesizer in 125 khz increments. The sum loop module 16B which is coupled to the fine step module is used for summing a plurality of the predetermined increments in order to produce the required frequency to modulate the inputted IF to the desired RF.

Referring now to FIG. 2, it can be seen that the converter 14 is a two stage converter. During the first stage, the inputted IF is sent through a first amplifier 14A to a mixer 14B. The reference oscillator 18 supplies a fixed signal which is passed through an amplifier 14C to the mixer 14B. The mixer 14B combines the inputted IF with a signal from the reference oscillator to produce a signal which is centered about a certain frequency. The frequency centered signal is then passed through a filter 14D and an amplifier 14E to the second stage of the converter 14. In the second stage, the frequency centered signal is sent to a mixer 14F. The synthesizer 16 also sends a signal to the mixer 14F in order to modulate the inputted IF to the desired RF. The mixer 14F combines the frequency centered signal and the synthesizer signal to produce the desired RF. The RF signal is then sent through a filter 14G and an amplifier 14H before been sent to the I/O switch 12.

Figure 3:
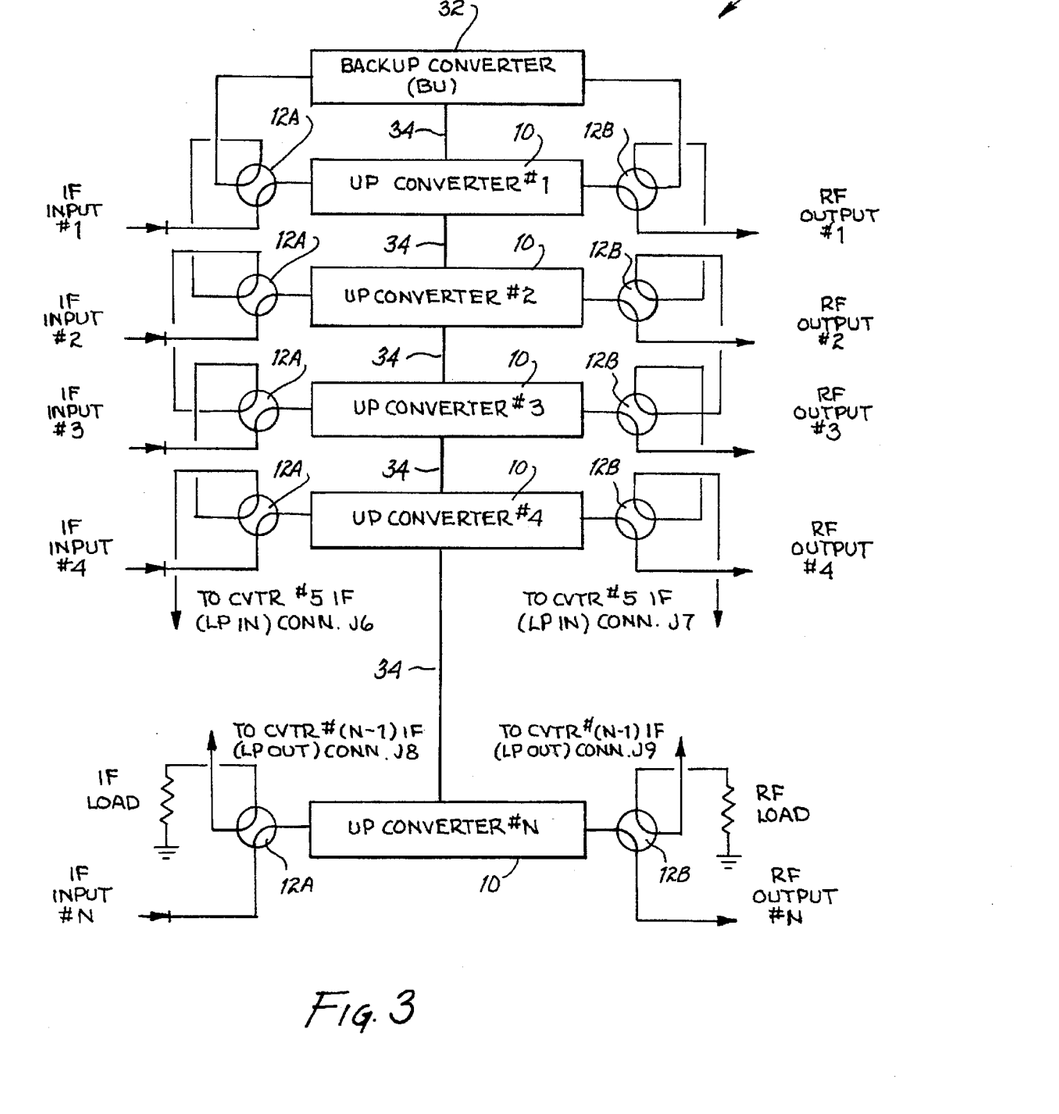
FIG. 3 shows a simplified block diagram of the distributed switching RF up converting system of the present invention.

Referring to FIG. 3, a redundant RF up converting system 30 is shown. According to one embodiment of the present invention, the RF up converting system 30 may be comprised of a single RF up converter 10 (up converter #1) coupled to a backup RF up converter 32. The backup RF up converter 32 is comprised of the same components as listed above for an RF up converter 10. The backup RF up converter 32 further has a microprocessor which performs fault detection, self reconfiguration and logical switching functions. This capability is accomplished through the operation of a high speed bus 34 which is coupled to both the single RF up converter 10 (up converter #1) and the backup RF up converter 32.

As mentioned above with reference to FIG. 1, the RF up converter 10 is comprised of an I/O switch 12. According to one embodiment of the present invention, the I/O switch 12 is a transmit switch module comprised of an IF transfer switch 12A and a RF transfer switch 12B. When a fault occurs on the online RF up converter 10 (up converter #1), the transmit switch module is activated. The IF transfer switch 12A and the RF transfer switch 12B of the transmit switch module transfer the IF input and the RF output to the backup RF up converter 32. The backup RF up converter 32, whose I/O switch is an I/O module, assumes the frequency and attenuation of the faulted RF up converter 10 and compensates for the loss.

According to another embodiment of the present invention, the IF transfer switch 12A can receive two inputs, IF input #1 (priority) and IF input #2. The two IF inputs are switched in the transmit switch module to provide redundant operation. The RF transfer switch 12B is provided with two RF outputs, RF output #1 (priority) and RF output #2. If the RF up converter 10 (up converter #1) carries the priority signal, the backup RF up converter 32 backs up the priority channel and IF signal #2 and RF signal #2 are not operational.

According to another embodiment of the present invention, the redundant RF up converting system 30 may be comprised of a plurality of RF up converters 10. Each of the RF up converters 10 is comprised of the components listed above for an RF up converter 10. The I/O switch 12 is a transmit switch module having an IF transfer switch 12A and the RF transfer switch 12B. The IF and RF transfer switches 12A, 12B are for input/output looping of the IF and RF signals. Each RF up converter 10 is looped to a successive RF up converter 10 to form an active "daisy chain"

configuration. The "daisy chain" terminates in a backup RF up converter 32 which is directly coupled to the first of the plurality of RF converters 10.

The backup RF up converter 32, which has the same components as an RF up converter 10, has a microprocessor which performs fault detection, self reconfiguration and logical switching functions. This capability is accomplished through the operation of a high speed bus 34 which is looped from the backup RF converter 32 to a first RF up converter 10 (up converter #1), to a second RF up converter 10 (up converter #2) and so on till it terminates at an Nth RF up converter 10.

Each of the RF up converters 10 has an IF and RF transfer switch 12A, 12B. When a fault occurs on one of the online RF up converters 10, the IF and RF transfer switches 12A, 12B switch the IF input and the RF output of the faulted online RF up converter 10 to the backup RF up converter 32. The faulted RF up converter 10 can now be removed from the redundant RF up converting system 30 by separating the RF up converter 10 from its I/O switch 12 leaving the active redundant RF up converting system 30 intact through the I/O switch 12.

Figure 4:
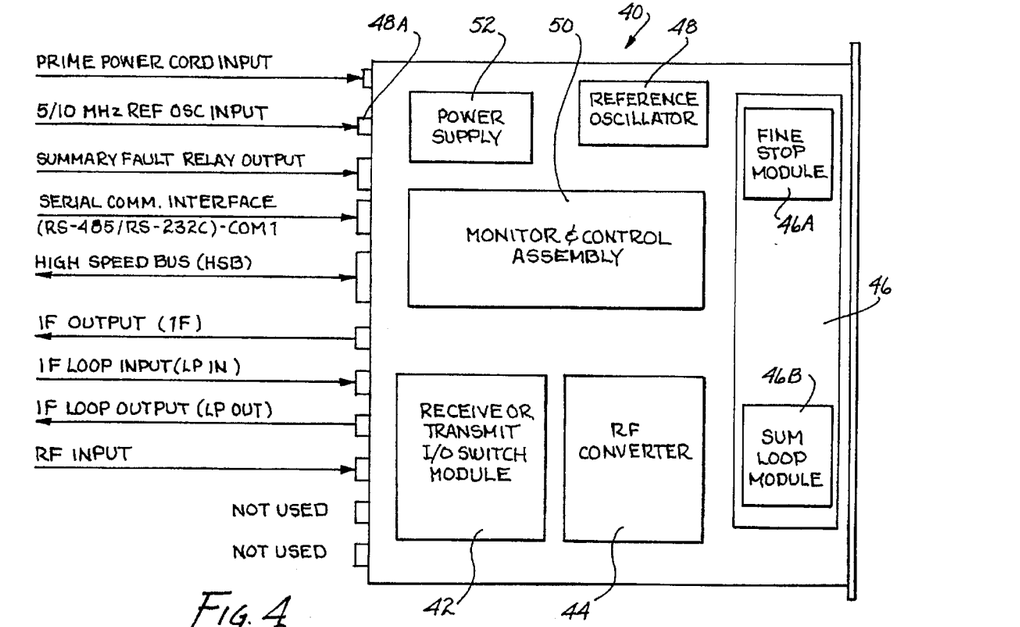
FIG. 4 shows a simplified block diagram of an RF down converter module with the distributed protection switching scheme of the present invention.
Figure 5:
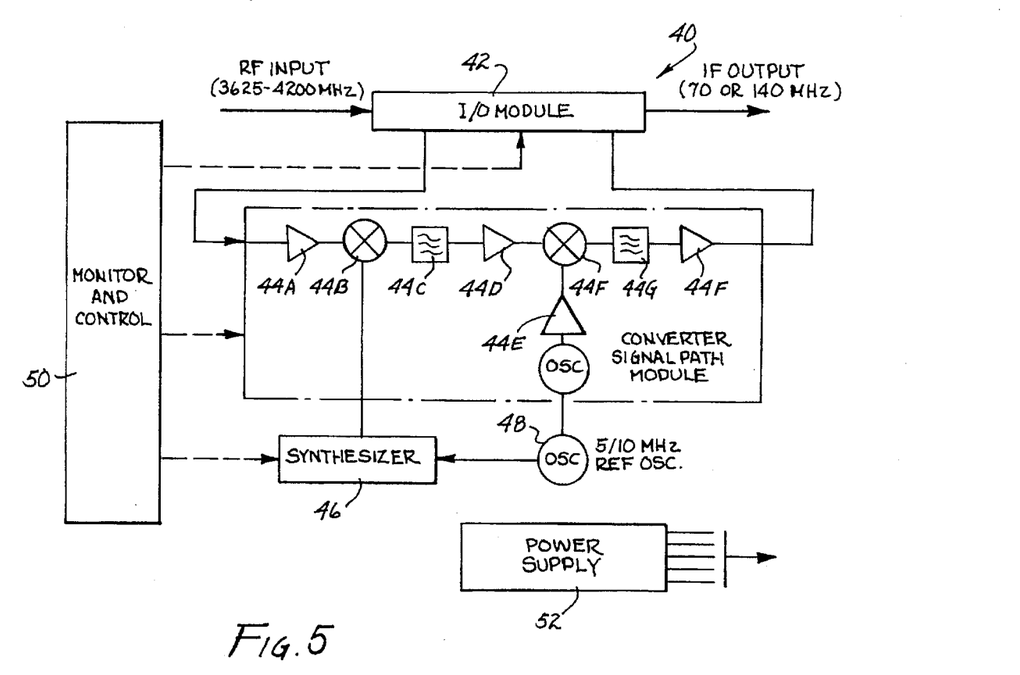
FIG. 5 shows a functional block diagram of an RF down converter module with the distributed protection switching scheme of the present invention.

Referring to FIGS. 4 and 5, an RF down converter 40 is shown. The RF down converter 40 is similar to the RF up converter 10 mentioned above. The RF down converter 40 is comprised of an input/output (I/O) switch 42 for receiving an inputted radio frequency (RF) and outputting a modulated intermediate frequency (IF). The I/O switch 42 is coupled to a converter 44. The converter 44 modulates the inputted RF to produce the desired IF. A synthesizer 46 is coupled to the converter 44 for providing a frequency to modulate the inputted RF to the desired IF. A reference oscillator 48 is coupled to the converter 44 and to the synthesizer 46. The reference oscillator 48 is a highly stable oscillator which is used to determine stability and to help stabilize the converter 44 and the synthesizer 46. The reference oscillator 48 can be an internal oscillator or it can be external to the RF down converter 40 and coupled to the RF down converter 40 at an input 48A (see FIG. 4). A monitor and control module 50 is coupled to the I/O switch 42, the converter 44 and the synthesizer 46 for controlling the modulation of the inputted RF to the desired IF. The monitor and control module 50 is also used for providing communication interface with a backup RF down converter (not shown). All of the above components are coupled to a power supply 52 which supplies power to all of the components of the RF down converter 40.

Referring specifically to FIG. 4, the synthesizer 46 is comprised of two separate components. The fine step module 46A is used for increasing the frequency of the synthesizer in predetermined increments in order to modulate the inputted RF to the desired IF. In the preferred embodiment of the present invention, the fine step module 46A increases or decreases the frequency of the synthesizer in 125 khz increments. The sum loop module 46B which is coupled to the fine step module is used for summing a plurality of the predetermined increments in order to produce the required frequency to modulate the inputted RF to the desired IF.

Referring now to FIG. 5, it can be seen that the converter 44 is a two stage converter. During the first stage, the inputted RF is sent through a first amplifier 44A to a mixer 44B. The synthesizer 46 also sends a signal to the mixer 44B in order to modulate the inputted IF. The mixer 44B combines the inputted IF and the synthesizer signal. The combined signal is then sent through a filter 44C and an amplifier 44D to the second stage of the converter 44. The reference oscillator 18 supplies a fixed signal which is passed through an amplifier 44E to a mixer 44F. The mixer 44F combines the output from the first stage of the converter 44 with the signal from the reference oscillator 48. This signal is then passed through a filter 44G and an amplifier 44H to produce the desired IF.

Figure 6:
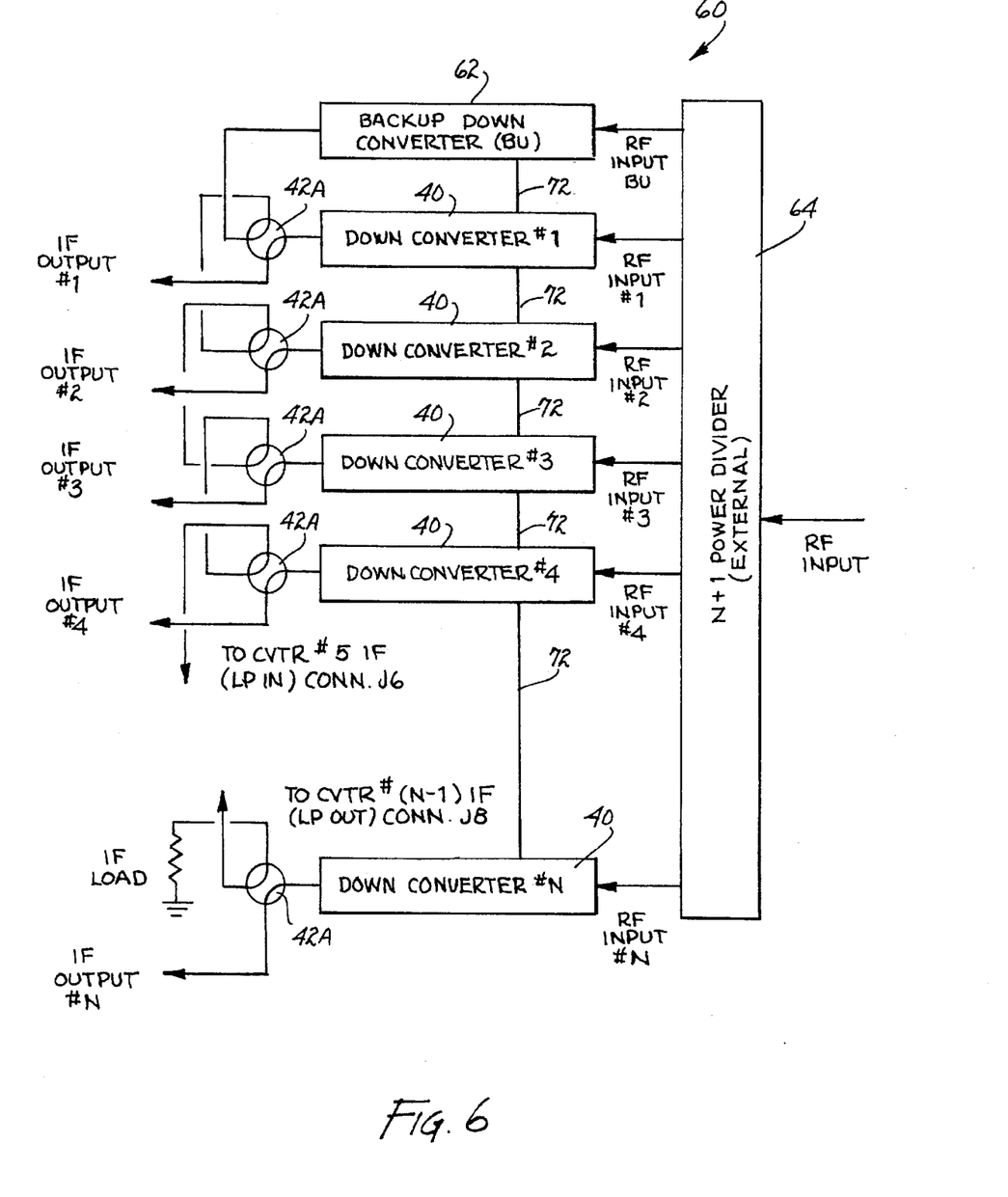
FIG. 6 shows a simplified block diagram of one embodiment of the distributed switching RF down converting system of the present invention.

Referring to FIG. 6, a redundant RF down converting system 60 is shown. According to one embodiment of the present invention, the RF down converting system 60 may be comprised of a single RF down converter 40 (down converter #1) coupled to a backup RF down converter 62. The backup RF down converter 62 is comprised of the same components as listed above for the RF down converter 40. The backup RF down converter 62 further has a microprocessor which performs fault detection, self reconfiguration and logical switching functions. This capability is accomplished through the operation of a high speed bus 72 which is coupled to both the single RF down converter 40 (down converter #1) and the backup RF down converter 62.

According to one embodiment of the present invention, a power divider 64 supplies an RF to both the single RF down converter 40 (down converter #1) and the backup RF down converter 62. The I/O switch 42 of the single RF down converter 40 (down converter #1) is a receive switch module comprised of an IF transfer switch 42A. When a fault occurs on the single online RF down converter 40 (down converter #1), the receive switch module is activated and the IF transfer switch 42A switches the IF output to the backup RF down converter 62. The backup RF converter 62, whose I/O switch is a I/O module, assumes the frequency and attenuation of the faulted RF down converter 40 and compensates for the loss.

According to another embodiment of the present invention, the I/O switch 42 is a receive switch module RF assembly (RSMA). The RSMA contains both an IF transfer switch 42A and an RF transfer switch for input/output looping of the signals. Under this embodiment, the RSMA can be configured for two RF inputs, RF input #1 (priority) and RF input #2 to provide redundant operation of the RF down converters 40. The RSMA also provides two switched IF outputs, IF output #1 (priority) and IF output #2. If the RF down converter 40 (down converter #1) carries the priority signal, the backup RF down converter 62 backs up the priority channel and RF signal #2 and IF signal #2 are not operational.

According to another embodiment of the present invention, the redundant RF down converting system 60 may be comprised of a plurality of RF down converters 40. Each of the plurality of RF down converters 40 is comprised of the components listed above for a single RF down converter 40. The I/O switch 42 is a receive switch module having an IF transfer switch 42A. The IF transfer switch 42A is for input/output looping of the IF signal. Each RF down converter 40 is looped to a successive RF down converter 40 to form an active "daisy chain" configuration. The "daisy chain" terminates in a backup RF down converter 62 which is directly coupled to the first RF converter 40 of the plurality of RF converters 40. A single RF input is supplied to the backup RF down converter 62 and each of the plurality of RF down converters 40 through a power divider 64.

The backup RF up converter 32, which has the same components as the RF down converter 40, has a microprocessor which performs fault detection, self reconfiguration and logical switching functions. This capability is accomplished through the operation of a high speed bus 72 which is looped from the backup RF down converter 62 to a first RF down converter (down converter #1), to a second RF down converter (down converter #2) and so on till it terminates at an Nth RF down converter 40.

Each of the RF down converters 40 has an IF transfer switch 42A. When a fault occurs on one of the online RF down converters 40, the IF transfer switch 42A switches the IF output of the faulted online RF down converter 40 to the backup RF down converter 62. The faulted RF down converter 40 can now be removed from the redundant RF down converting system 60 by separating the RF down converter 40 from its I/O switch 42 leaving the active redundant RF down converting system 60 intact through the I/O switch 42.

Figure 7:
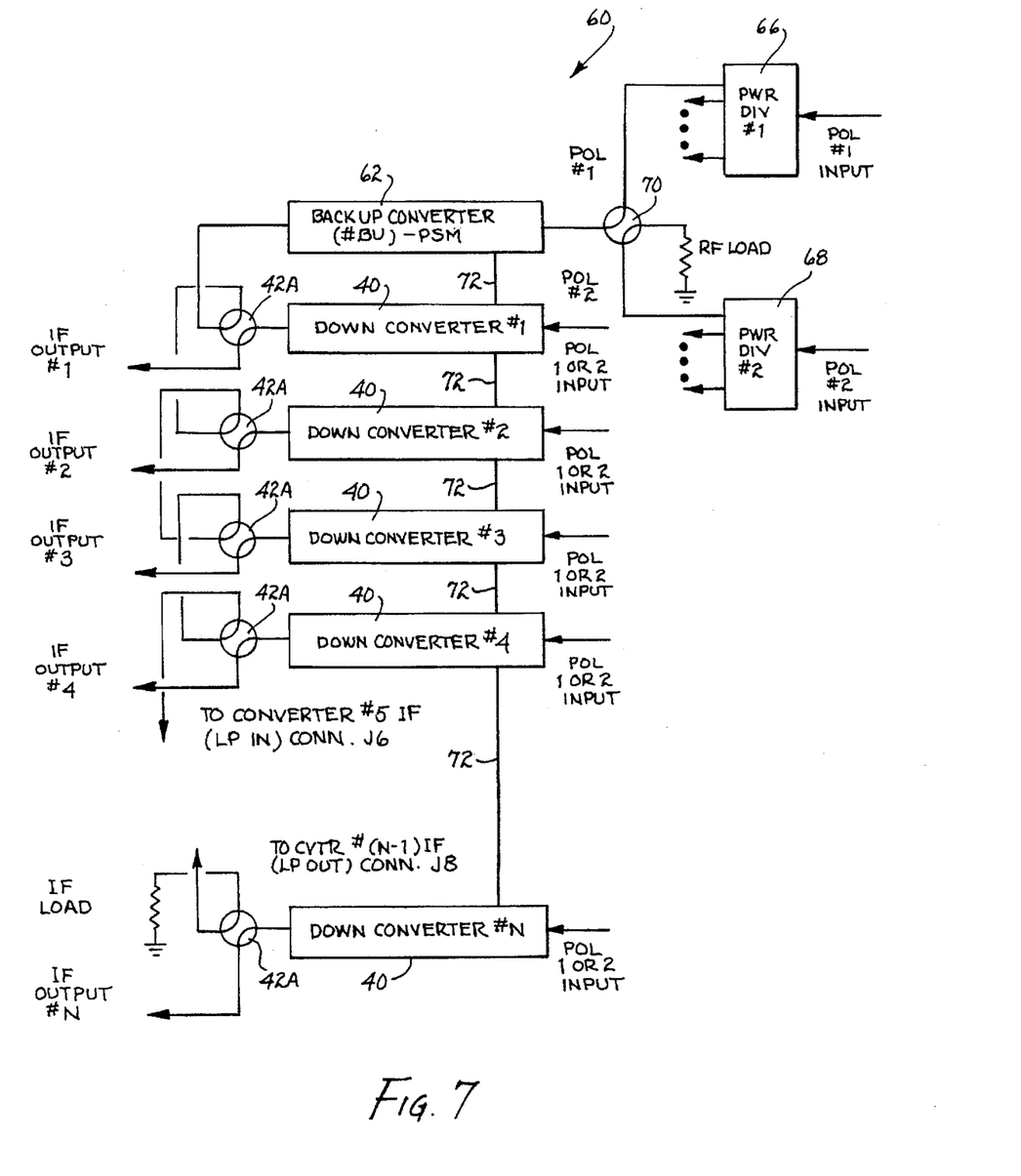
FIG. 7 shows a simplified block diagram of another embodiment of the distributed switching RF down converting system of the present invention.

Referring to FIG. 7, another embodiment of the redundant RF down converting system 60 is shown. This embodiment is similar to the previous embodiment except that a single RF input is not used. Instead, an RF input having polarity 1 or polarity 2 is inputted to each RF down converter 40 through a polarity 1 power divider 66 or a polarity 2 power divider 68. The backup RF down converter 62 is provided with a detachable polarity switch module 70 to perform the RF transfer switching from two low noise amplifier (LNA) subsystems (not shown). The backup RF down converter 62 will call for the polarity of the faulted online RF down converter 40 via the high speed bus 72 and set the polarity switch accordingly.

It should be noted that the switching mechanisms used in the RF up and down converting systems may be used for other types of communication equipment to provide distributed protection without the use of a centralized switching unit. For example, the "daisy chain" concept could be used to loop a plurality of modems to a backup modem. Furthermore, the "daisy chain" concept could be used to loop a plurality of amplifiers to a backup amplifier.

While the invention has been particularly shown and described with reference to preferred embodiments thereof, it will be understood by those skilled in the art that the foregoing and other changes in form and details may be made therein without departing from the spirit and scope of the invention.

We claim:

1. A radio frequency (RF) converter system for transmission of communication signals and which provides reliable backup protection through a distributed protection switching scheme that prevents disruption in communication due to an RF converter failure comprising, in combination:

first RF converter means for modulating an inputted intermediate frequency (IF) and outputting a desired RF, wherein said first RF converter means has means for monitoring and controlling modulation of said inputted IF and for providing communication interface with a backup RF converter;

backup RF converter means looped to said first RF converter means for performing fault detection and for assuming a frequency and an attenuation of said first RF converter means when a fault is detected on said first RF converter means, said backup RF converter means having means for performing fault detection, self reconfiguration, and logical switching functions; and high speed bus means looped to said backup RF converter means and said first RF converter means for providing an interface between said first RF converter means and said backup RF converter means so said backup RF converter means can monitor configuration changes in said first RF converter means;

wherein each of said first RF converter means and said backup converter means individually comprises:

switching means for switching said inputted IF and said desired RF from said first RF converter means to said backup RF converter means when said fault is detected on said first RF converter means and from said backup RF converter means back to said first RF converter means when said first RF converter means is cleared of said fault;

input/output module means for looping said inputted IF and said desired RF between said first RF converter means and said backup RF converter means;

power supply means for supplying power;

monitor/control means coupled to said power supply means for controlling modulation of said inputted IF and for providing communication interface;

converter means coupled to said switching means for receiving and modulating said inputted IF to said desired RF;

synthesizer means coupled to said converter means for providing a frequency to modulate said inputted IF to said desired outputted RF; and reference oscillator means coupled to said converter means and said synthesizer means for stabilizing said converter means and said synthesizer means.

2. An RF converting system in accordance with claim 1 wherein said switching means coupled to said first RF converter means having means for receiving two IF inputs to provide said distributed protection switching scheme.

3. An RF converter system for transmission of communication signals and which provides reliable backup protection through a distributed protection switching scheme that prevents disruption in communication due to an RF converter failure comprising, in combination:

a plurality of RF converter means for modulating an inputted IF to each of said plurality of RF converter means and outputting a desired RF from each of said plurality of RF converter means wherein each of said plurality of RF converter means has means for monitoring and controlling modulation of said inputted IF and for providing communication interface with a backup RF converter;

backup RF converter means coupled to a first of said plurality of RF converter means for performing fault detection and for assuming a frequency and an attenuation of any of said plurality of RF converter means where a fault occurs, said backup RF converter means having means for performing fault detection, self reconfiguration, and logical switching functions;

each of said plurality of RF converter means and said backup RF converter means having switching means for switching said inputted IF and said desired RF of any of said plurality of RF converter means to said backup RF converter means when said fault occurs and from said backup RF converter means back to one of said plurality of RF converter means from which said fault is cleared;

each of said plurality of RF converter means and said backup RF converter means further having input/output module means for looping said inputted IF and said desired RF between each of said plurality of RF converter means and said backup RF converter means; and high speed bus means for looping each of said plurality of RF converter means to a successive RF converter means of said plurality of RF converter means and for providing an interface between each of said plurality of RF converter means and said backup RF converter means so said backup converter means can monitor configuration changes in each of said plurality of RF converter means.

4. An RF converting system in accordance with claim 3 wherein said switching means coupled to each of said plurality of RF converter means is transmit switch module means for looping said inputted IF and said desired RF of each of said plurality of RF converter means to said successive RF converter means of said plurality of RF converter means and for switching any of said plurality of RF converter means where said fault occurs to said backup RF converter means.

5. An RF converting system in accordance with claim 4 wherein each of said plurality of RF converter means and said backup RF converter means further comprises:

power supply means for supplying power;
  monitor/control means coupled to said power supply means for controlling modulation of said inputted IF and for providing communication interface with said backup RF converter means;
  converter means coupled to said switching means for receiving and modulating said inputted IF to said desired RF;
  synthesizer means coupled to said converter means for providing a frequency to modulate said inputted IF to said desired outputted RF; and
  reference oscillator means coupled to said converter means and said synthesizer means for stabilizing said converter means and said synthesizer means.

6. An RF converting system in accordance with claim 5 wherein said synthesizer means is comprised of:

fine step module means for increasing said frequency in predetermined increments to modulate said inputted IF to said desired RF; and
  sum loop module means coupled to said fine step module means for summing a plurality of said predetermined increments to produce said frequency to modulate said inputted IF to said desired RF.

7. An RF converter system for receiving communication signals and which provides reliable backup protection through a distributed protection switching scheme that prevents disruption in communication due to an RF converter failure comprising, in combination:

first RF converter means for modulating an inputted RF and outputting a desired IF, wherein said first RF converter means has means for monitoring and controlling modulation of said inputted RF and for providing communication interface with a backup RF converter;
  backup RF converter means looped to said first RF converter means for performing fault detection and for assuming a frequency and an attenuation of said first RF converter means when a fault is detected on said first RF converter means, said backup RF converter means having means for performing fault detection, self reconfiguration, and logical switching functions; and
  high speed bus means looped to said backup RF converter means and said first RF converter means for providing an interface between said first RF converter means and said backup RF converter means so said backup RF converter means can monitor configuration changes in said first RF converter means;
  wherein each of said first RF converter means and said backup converter means individually comprises:

switching means for switching said inputted RF and said desired IF from said first RF converter means to said backup RF converter means when said fault is detected on said first RF converter means and from said backup RF converter means back to said first RF converter means when said first RF converter means is cleared of said fault;
  input/output module means for looping said inputted RF and said desired IF between said first RF converter means and said backup RF converter means;
  power supply means for supplying power;
  monitor/control means coupled to said power supply means for controlling modulation of said inputted IF and for providing communication interface;
  converter means coupled to said switching means for receiving and modulating said inputted IF to said desired RF;
  synthesizer means coupled to said converter means for providing a frequency to modulate said inputted IF to said desired outputted RF; and
  reference oscillator means coupled to said converter means and said synthesizer means for stabilizing said converter means and said synthesizer means.

8. An RF converter system in accordance with claim 7 further comprising power divider means coupled to said first RF converter means and to said backup RF converter means for receiving a single inputted RF and for sending said single inputted RF to said first converter means and to said backup converter means.

9. An RF converting system in accordance with claim 7 wherein said switching means coupled to said first RF converting means is receive switch module RF assembly means for looping said inputted RF and said desired outputted IF of said first RF converter means to said backup RF converter means when said fault is detected on said first RF converter means.

10. An RF converting system in accordance with claim 8 wherein said switching means coupled to said first RF converting means is receive switch module means for looping said desired outputted IF of said first RF converter means to said backup RF converter means when said fault is detected on said first RF converter means.

11. An RF converter system for transmission of communication signals and which provides reliable backup protection through a distributed protection switching scheme that prevents disruption in communication due to an RF converter failure comprising, in combination:

a plurality of RF converter means for modulating an inputted RF to each of said plurality of RF converter means and for outputting a desired IF from each of said plurality of RF converter means wherein each of said plurality of RF converter means has means for monitoring and controlling modulation of said inputted RF and for providing communication interface with a backup RF converter;
  backup RF converter means coupled to a first of said plurality of RF converter means for performing fault detection and for assuming a frequency and an attenuation of any of said plurality of RF converter means when a fault occurs, said backup RF converter means having means for performing fault detection, self reconfiguration, and logical switching functions;
  each of said plurality of RF converter means and said backup RF converter means having switching means for switching said outputted desired RF from any of said plurality of RF converter means to said backup RF converter means when said fault occurs and from said backup RF converter means back to one of said plurality of RF converter means from which said fault is cleared;

each of said plurality of RF converter means and said backup RF converter means also having switch module means for looping said inputted RF and said desired IF between each of said plurality of RF converter means and said backup RF converter means; and high speed bus means for looping each of said plurality of RF converter means to a successive RF converter means of said plurality of RF converter means and for providing an interface between each of said plurality of RF converter means and said backup RF converter means so said backup RF converter means can monitor configuration changes in each of said plurality of RF converter means.

12. An RF converting system in accordance with claim 11 wherein said switching means coupled to each of said plurality of RF converter means having means for switching said inputted RF of any of said plurality of RF converter means to said backup RF converter means when said fault occurs.

13. An RF converting system in accordance with claim 11 further comprising power divider means coupled to each of said plurality of RF converter means and to said backup RF converter means for receiving a single RF and for sending said single RF to said plurality of RF converter means and said backup RF converter means.

14. An RF converting system in accordance with claim 11 wherein said switching means coupled to each of said plurality of RF converting means is receive switch module means for looping said desired outputted IF of each of said plurality of RF converter means to a successive RF converter means of said plurality of RF converter means and for switching any of said plurality of RF converter means to said backup RF converter means when said fault occurs.

15. An RF converting system in accordance with claim 11 wherein said switching means coupled to each of said plurality of RF converting means is receive switch module RF assembly means for looping said inputted RF and said desired outputted IF of any of said plurality of RF converter means to said backup RF converter means when said fault occurs.

16. An RF converting system in accordance with claim 11 wherein said switch module means coupled to said backup converter means is input/output module means for receiving said inputted RF from any of said plurality of RF converter means when said fault occurs and for outputting said desired IF of said plurality of RF converter means when said fault occurs.

17. An RF converting system in accordance with claim 11 wherein said switch module means coupled to said backup RF converter means is polarity switch module means for switching said backup RF converter to a proper polarity corresponding to a polarity of any of said plurality of RF converter means when said fault occurs.

18. An RF converting system in accordance with claim 11 wherein each of said plurality of RF converter means and said backup RF converter means further comprises:

power supply means for supplying power;

monitor and control means coupled to said power supply means for controlling modulation of said inputted RF and for providing communication interface with said backup RF converter means;

converter means coupled to said switching means for receiving and modulating said inputted RF to said desired IF;

synthesizer means coupled to said converter means for providing a frequency to modulate said inputted RF to said desired IF; and reference oscillator means coupled to said converter means and said synthesizer means for stabilizing said converter means and said synthesizer means.

19. An RF converting system in accordance with claim 18 wherein said synthesizer means is comprised of:

fine step module means for increasing said frequency in predetermined increments to modulate said inputted RF to said desired IF; and sum loop module means coupled to said fine step module means for summing a plurality of said predetermined increments to produce said frequency to modulate said inputted RF to said desired IF.

20. A distributed protection switching scheme that provides reliable backup protection that prevents disruption in communications due to communication equipment failure comprising, in combination:

first communication equipment means for exchanging communication signals wherein said first communication equipment means has means for monitoring and controlling modulation of said communication signals and for providing communication interface with a backup communication means; and backup communication equipment means coupled to said first communication equipment means for performing fault detection and for replacing said first communication equipment means when a fault is detected on said first communication equipment means, said backup communication equipment means having means for performing fault detection, self reconfiguration, and logical switching functions;

wherein both said first communication equipment means and said backup communication equipment means has switching means for switching said communication signals from said first communication equipment means to said backup communication equipment means when said fault is detected on said first communication equipment means and from said backup communication equipment means to said first communication equipment means when said fault on said first communication equipment means is cleared.

21. A distributed protection switching scheme in accordance with claim 20 further comprising:

input/output module means individually coupled to said backup communication equipment means and to said communication equipment means for receiving said communication signal when said fault occurs and for exchanging said communication signals; and high speed bus means coupled to said backup communication equipment means and said first communication equipment means for providing an interface between said first communication equipment means and said backup communication equipment means so said backup communication equipment means can monitor configuration changes in said first communication equipment means.

22. A distributed protection switching scheme that provides reliable backup protection that prevents disruption in communications due to communication equipment failure comprising, in combination:

a plurality of communication equipment means for exchanging communication signals wherein each of said plurality of communication equipment means has means for monitoring and controlling modulation of said communication signals and for providing communication interface with a backup communication means;

backup communication equipment means coupled to a first of said plurality of communication equipment means for performing fault detection and for replacing any of said plurality of communication equipment means when a fault occurs, said backup communication equipment means having means for performing fault detection, self reconfiguration, and logical switching functions;

wherein each of said plurality of communication equipment means and said backup communication equipment means has switching means for switching said communication signal of any of said plurality of communication equipment means to said backup communication equipment means when said fault occurs and from said backup communication equipment means back to one of said plurality of communication equipment means from which said fault id cleared;

wherein each of said plurality of communication equipment means and said backup communication equipment means further has input/output module means for exchanging said communication signals when said fault occurs on any of said plurality of communication equipment means; and high speed bus means for looping each of said plurality of communication equipment means to a successive communication equipment means of said plurality of communication equipment means and for providing an interface between each of said plurality of communication equipment means and said backup communication equipment means so said backup communication equipment means can monitor configuration changes in each of said plurality of communication equipment means.

\* \* \* \* \*